United States Patent
Shrader

(12) 
(10) Patent No.: US 6,311,840 B1
(45) Date of Patent: Nov. 6, 2001

(54) PERSONAL IDENTIFICATION FOR IMPROVED HYGIENE

(76) Inventor: Arthur J. Shrader, 5804A Grassmere La., Dallas, TX (US) 75205

( * ) Notice: Subject to any disclaimer, the term of this patent is extended or adjusted under 35 U.S.C. 154(b) by 0 days.

(21) Appl. No.: 09/434,792

(22) Filed: Nov. 5, 1999

(51) Int. Cl.⁷ ................................................ B65D 83/04
(52) U.S. Cl. ................ 206/459.1; 206/534; 215/230; 116/309
(58) Field of Search ............... 206/459.1, 459.5, 206/534, 528, 540; 215/228, 230, 386; 116/308, 309, 227, 317; 40/306–311

(56) References Cited

U.S. PATENT DOCUMENTS

| | | | |
|---|---|---|---|
| 3,960,713 | * | 6/1976 | Carey ................. 206/534 |
| 4,405,045 | * | 9/1983 | Villa-Real ............ 206/534 |
| 4,877,119 | * | 10/1989 | Hosking ............ 206/459.1 |
| 4,920,912 | * | 5/1990 | Kirkling ............. 116/308 |
| 5,823,346 | * | 10/1998 | Weiner ............. 206/459.1 |
| 6,089,180 | * | 7/2000 | Nichols, Jr. .......... 116/309 |

* cited by examiner

Primary Examiner—Luan K. Bui
(74) Attorney, Agent, or Firm—Harold Levine, P.C.

(57) ABSTRACT

A personal identification method and system for improving personal hygiene in which provision is made for identifying a beverage, food product, or the like, with a particular person so that another person does not inadvertently access the identified item unintentionally. Identifying indicia such as numbers or alphabetical letters are selectable and conditioned by the user to be prominently displayed on the item so as to identify it with the individual involved. For necked beverage containers, in one embodiment, a re-usable snap-on display device, or assembly, is configured to snap onto the neck of the container; in another embodiment, the existing conventional cap-attaching ring is modified to include alpha-numeric indicia and/or to receive a cooperating indicia-indicating display element. For beverage cans, a wandl-like element portraying selectable alpha-numeric indicia is attached to the conventional snap ring opener; and for boxed beverages, a plurality of selectable identifying apertures are provided so that the user can personally distinguish his or her beverage from those of others.

12 Claims, 4 Drawing Sheets

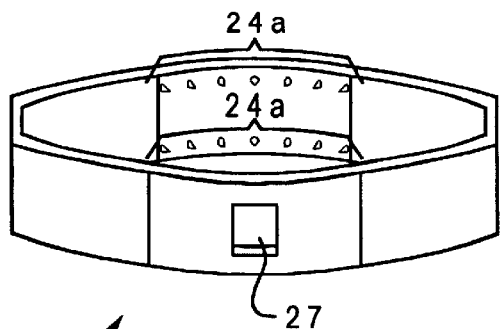
Fig. 5
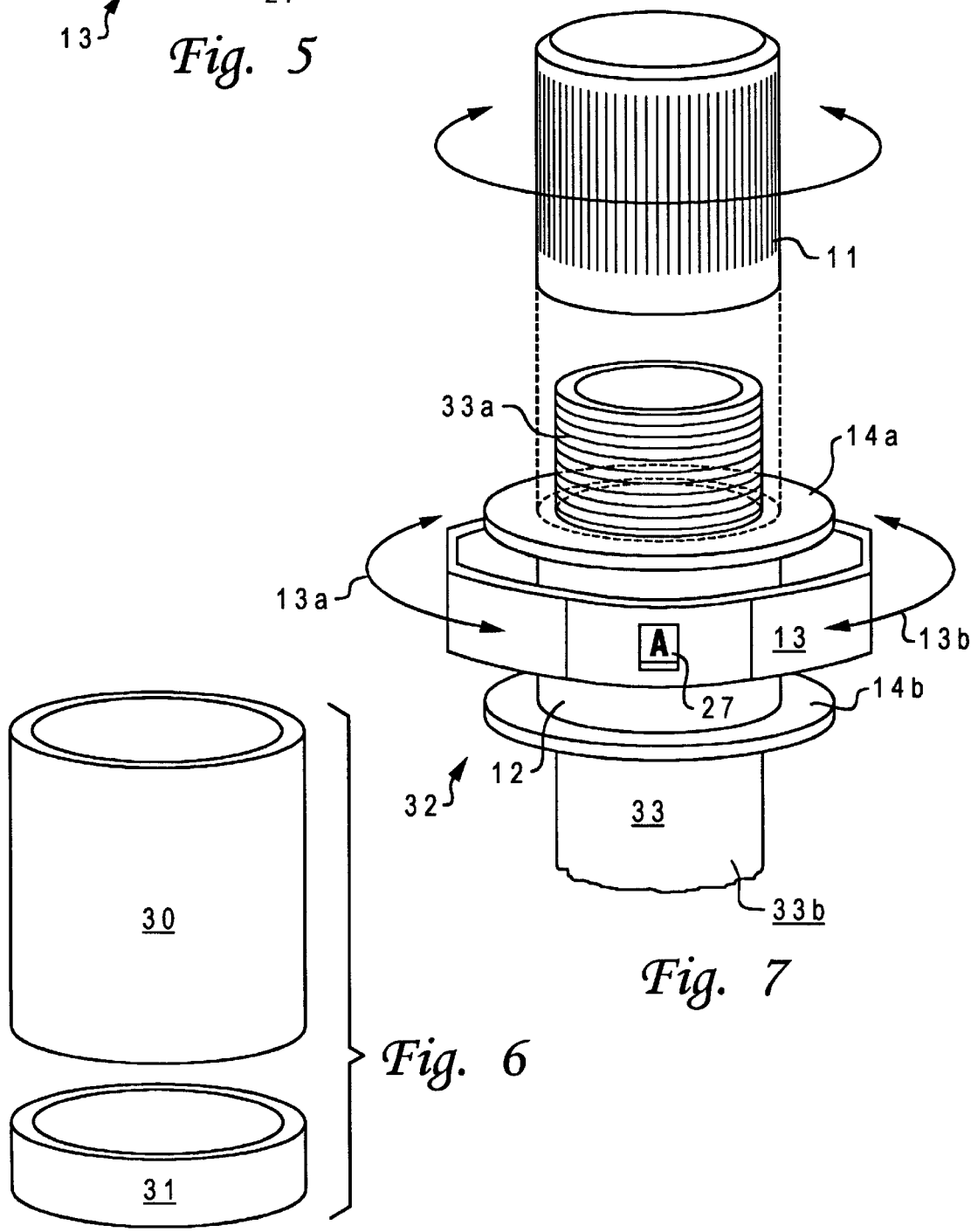
Fig. 6
Fig. 7

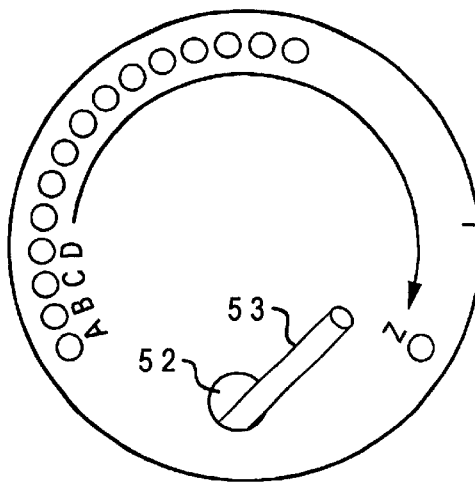
*Fig.* 10
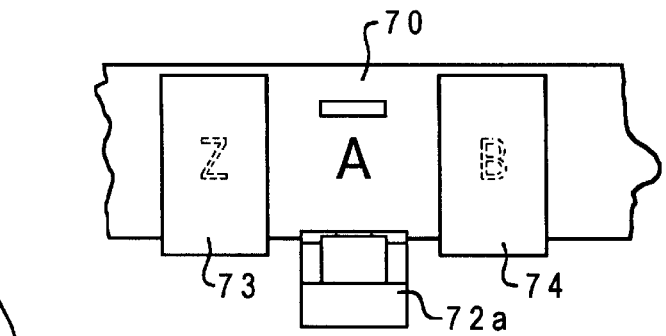
*Fig.* 12
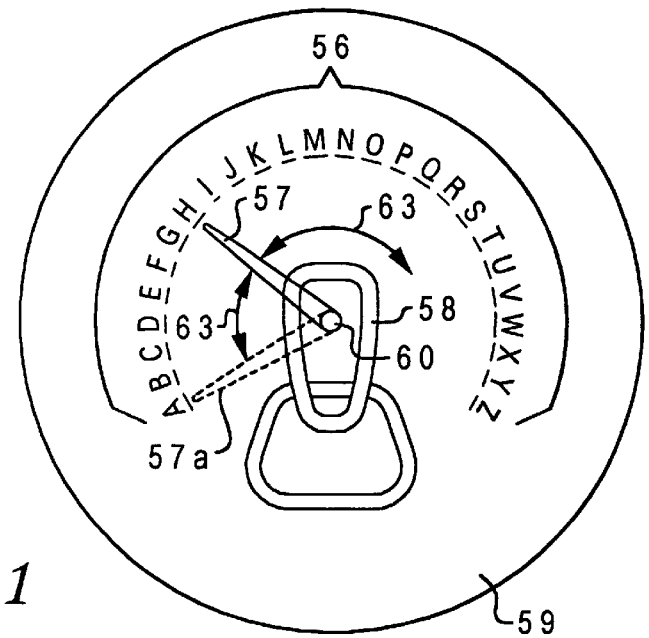
*Fig.* 11
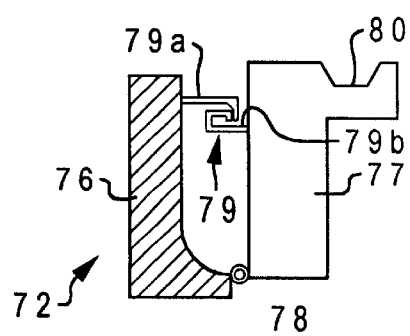
*Fig.* 13
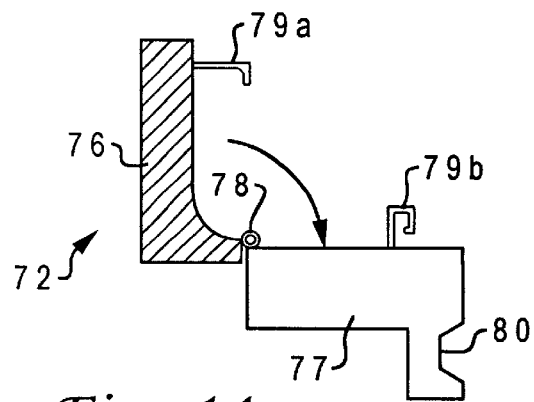
*Fig.* 14

PERSONAL IDENTIFICATION FOR IMPROVED HYGIENE

This invention relates to devices and methods for facilitating identification of beverage containers and similar items in order to discourage inadvertent or mistaken identity by another with resultant use and potential spreading of communicable disease.

BACKGROUND OF THE INVENTION

Personal identification of food and beverage containers has heretofore been proposed, illustrative of which are the proposals of U.S. Pat. No. 2,024,889 granted to A. Simeone Dec. 17, 1935; U.S. Pat. No. 3,392,468 granted to David Wolf on Jul. 16, 1968; U.S. Pat. No. 3,974,916 granted to Edgar O. Bartolucci on Aug. 17, 1976; U.S. Pat. No. 4,203,240 granted to George I. Goodwin May 20, 1980; U.S. Pat. No. 4,347,804 granted to Antony-Euclid C. Villa-Real on Sep. 7, 1982; U.S. Pat. No. 4,759,139 granted to M. David Ricks on Jul. 26, 1988; U.S. Pat. No. 4,901,457 granted to Donald O. Chandler on Feb. 20, 1990; U.S. Pat. No. 5,492,077 granted to Howard L. Rose on Feb. 20, 1996; U.S. Pat. No. 5,799,815 granted to Michael A. Lang on Sep. 1, 1998; U.S. Pat. No. 5,839,581 granted to Douglas Vagedes on Nov. 24, 1998; and U.S. Pat. No. 5,845,777 granted to Boman K. Najmi on Dec. 8, 1998.

Although such proposals have addressed selected problems encountered in providing personal identification for containers of alimentary products (e.g., food and beverages), there have continued to be certain drawbacks to their use. Thus, apparently for a variety of reasons such as cost or cumbersomeness in use, they have not found popular expression in the market place. Accordingly, there has continued to be a need for improved and more attractive product identification devices that are simple, easy to use, and cost effective.

BRIEF SUMMARY OF THE INVENTION

The improved devices and methods according to the invention hereof include simple and cost effective features that ameliorate adverse conditions and characteristics heretofore associated with prior use and conditions. Thus, in accordance with preferred embodiments hereof, improved identification is provided for conventional screw-top beverage bottles, conventional pop-top cans and boxed and bagged beverages.

For a screw top beverage bottle, lips are added to the upper and lower extremities of the lower, or retaining ring, portion so that a turnable identification ring can readily be mounted (e.g., snapped) thereupon; letters and/or numerals are disposed around the annular exposed periphery of the identification ring; and a turnable (rotatable) member is mounted between the lips. A window is disposed within the side wall of the rotatable follower member so that as the turnable member is turned, the letters and/or numerals are successively displayed through the window to the exterior. The geometry and size of the turnable member are such that when it is snapped in place, there is a frictional fit between a pair of its internal surfaces and the exterior surface of the retaining ring thus preventing the follower member from moving once it is positioned by the user. As an alternative to, or in addition to, exclusively frictional retention, spaced indentations may optionally be provided in the retaining ring so as to engage with extending protrusions positioned within the turnable member so that when protrusions enter indentations, the turnable member is disengagably locked into position. Unlocking is performed by squeezing the turnable member at predetermined locations so as to spring the protrusions outwardly and disengage them from the indentations.

For bottles not originally fitted with a retaining ring, (e.g., bottles adapted for metallic press-fit caps), a ring may readily be installed by forcing a stretchable cylindrically-shaped member, or wrap-around member about the neck of the bottle in the location normally occupied by a screw-cap retaining ring.

To apply the principles of the invention to conventional pop top cans, a semi-circular array of indicating letters and/or numbers is located on the top outer surface of the can; and a swivelable arm (identification wand) is mounted on the opening mechanism so as to provide a means whereby the user can swivel the arm (wand) to point to a selected one of the indicia (e.g., letters and/or numerals).

For boxed and bagged beverages and for cup tops, a relatively large number of closed but penetrable apertures are provided, each identified with a different alpha-numeric character (number or alphabet letter); and selection is made by selecting the desired one of the penetrable apertures (e.g., as by pushing a straw therethrough). In addition, a rotating selection dial may be attached to the exterior of the box or bag, and selection of an identifying indicia is made by setting the dial to a desired position.

OBJECTS AND FEATURES OF THE INVENTION

It is one general object of the invention to improve personal hygiene.

It is another object of the invention to facilitate personal identification of food and beverage containers.

It is yet another object of the invention to reduce cost and complexity associated with personal identification of food and beverage containers.

Accordingly, in accordance with one feature of the invention, in one embodiment, spaced, parallel retaining lips are disposed on the neck of a beverage bottle; selectable indicia are disposed in a circumferential array about the neck of the bottle, and a mating turnable member (rotatable follower) is disposed to display to view the selected indicia, thus facilitating customized selectable identification.

In accordance with another feature of the invention, the aforementioned turnable member is configured to present geometrical characteristics whereby when installed on the neck of the bottle between the aforementioned lips, interior surfaces frictionally engage corresponding exterior surfaces of the bottle neck or of a retaining ring on the bottle neck, thereby facilitating retaining the turnable member (i.e., follower) in a desired identifying position.

In accordance with yet another feature of the invention, in one embodiment, protrusions are positioned within the turnable member; and mating indentations are provided in a mating sleeve mounted on the bottle neck or on the bottle neck itself, thereby providing additional facility for retaining the turnable member in a selected position.

In accordance with still another feature of the invention, provision is made for ease of freeing the turnable member from frictional or locking retention in a particular position by the inclusion of predetermined geometrical characteristics to the turnable member whereby the turnable member may be freed to turn by the exertion of manual pressure to preselected resilient regions on the turnable member.

In accordance with yet another feature of the invention, when locked by the aforementioned protrusions and indentations, unlocking is performed by squeezing on the turnable member at predetermined regions so as to spring the protrusions outwardly and disengage them from the indentations thus facilitating ease of unlocking.

In accordance with still another feature of the invention, an aperture is provided within a sidewall of the turnable member so that as the turnable member is rotated, the aforementioned visual indicia (e.g., letters and/or numerals) are successively displayed through the aperture to the exterior, thus facilitating visual identification.

In accordance with still one further feature of one embodiment of the invention, for bottles not originally fitted with a retaining ring, (e.g., bottles adapted for metallic press-fit caps), selectable identifying indicia may be positioned on the bottle neck directly or on a ring installed by forcing a stretchable cylindrically-shaped member, or wrap-around member about the neck of the bottle in the location normally occupied by a screw-cap retaining ring, thus improving versatility of application of the principles hereof.

In accordance with yet another feature of the invention, in one embodiment, a plurality of privacy flaps are provided to permit selection of a desired indicia without the necessity for a turnable member.

In accordance with another feature of the invention, the principles of the invention are made applicable to conventional pop top cans by disposing a semi-circular array of indicating letters and/or numbers on the top outer surface of the can; and a swivelable arm (identification wand) is mounted on the opening mechanism so as to provide a means whereby the user can swivel the arm (wand) to point to a selected one of the indicia (e.g., letters and/or numerals).

In accordance with yet another feature of the invention, for boxed and bagged beverages and for cup tops, a relatively large number of closed but penetrable apertures are provided, each identified with a different alpha-numeric character (number or alphabet letter); and selection is made by selecting the desired one of the penetrable apertures (e.g., as by pushing a straw therethrough), thus facilitating selective identification.

In accordance with yet another feature of the invention, a rotating selection dial may be attached to the exterior of the box or bag, and selection of an identifying indicia may be made by setting the dial to a desired position, thus further facilitating identification.

These and other objects and features of the invention will be apparent from the following description, by way of example of a preferred embodiment, with reference to the drawing.

BRIEF DESCRIPTION OF THE DRAWING

FIG. 5 is a perspective view of the member of FIG. 4;

FIG. 6 is an elevation view of a stretchably resilient sleeve member adapted for fitting onto the neck of a crimped-cap bottle;

FIG. 7 is a partially exploded view of the members of FIGS. 3–5 when assembled together and mounted on the neck of a bottle;

FIG. 10 is a top view of a beverage cup lid fitted with a plurality of indicia-representing and identifying apertures according to the invention;

FIG. 11 is a top view of a pop-top beverage can fitted with identification indicia and a selectable pointing device according to the invention;

FIG. 12 is a front elevation detailed view of a segment of an identification ring fitted with privacy flaps;

FIG. 13 is a detail, partly in section, depicting one of the privacy flaps of FIG. 12 in its closed position in which it prevents view of its covered indicia; and FIG. 14 is a detail similar to that of FIG. 13 but depicting the privacy flap in its open, or viewing, position in which its underlying indicia is observable.

DESCRIPTION OF A PREFERRED EMBODIMENT

As employed in this specification and claims, the following terms are defined as follows:

1. Identity-indicating Alpha Numeric Indicia: means one or more ciphers, numerals, characters or a combination thereof whose purpose is to identify the object on which it is displayed.
2. Turnable Member: means a multi-faced non-circular ring having a major lateral dimension greater than a perpendicular lateral dimension, and having one or more regions adjacent extremities bounding said major dimension which, when urged inwardly, correspondingly urge outwardly portions adjacent said perpendicular dimension thereby decreasing said major dimension and increasing said perpendicular dimension.

Figure 1:
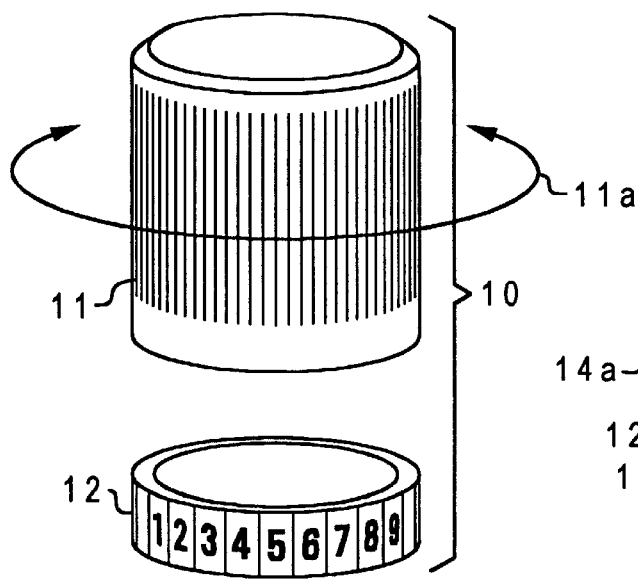
FIG. 1 is a front elevation view depicting a conventional screw-on-type bottle closure separated from its retaining ring.
Figure 2:
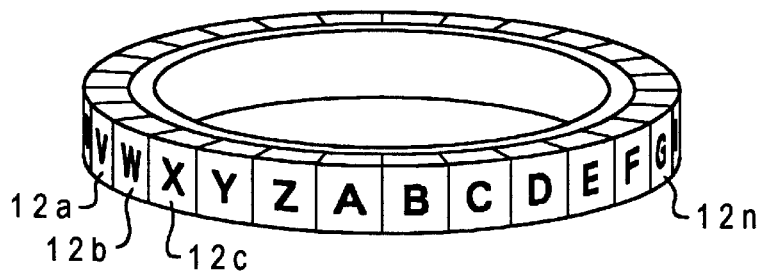
FIG. 2 is a tilted front elevation view depicting an indicia inscribed ring according to the invention.

Now turning to the drawing, and more particularly FIG. 1 thereof, it will be seen to depict the two parts 11 and 12 of a conventional screw-type bottle cap 10 after the parts have been separated by unscrewing the cap from its bottle as represented by the circular arrow 11a. As is well known, the lower collar part 12 ordinarily remains on the neck of its bottle after the cap 11 is removed, thus providing a convenient medium for displaying identify-indicating alpha-numeric indicia. In accordance with one preferred embodiment of the invention, the ring 12 is marked with identity-indicating indicia as depicted in FIGS. 1 and 2. In FIG. 1, the indicia are arabic numerals and/or letters of the alphabet; whereas in FIG. 2 the indicia are letters of the alphabet. These, it will be observed, are individually disposed within a corresponding plurality of circumferentially disposed segments which, in FIG. 2 are identified as 12a, 12b, 12c . . . 12n. For bottles not having a lower collar part 12, such indicia may be disposed directly on the neck surface (e.g., neck 33 of FIG. 7).

Figure 3:
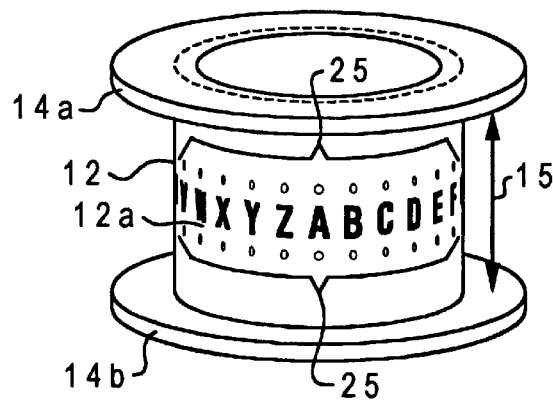
FIG. 3 is an elongated view of a retaining ring such as that depicted in FIG. 1 to which spaced parallel lips and identifying indicia have been added.

To equip collar 12 for receiving a cooperating turnable member 13 (FIGS. 4–5), a pair of spaced-apart lips 14a and 14b are fastened to, or made part of, member 12 at its upper and lower extremities so as to form the spool-shape depicted in FIG. 3. Such spacing is depicted by arrow 15.

Turnable member 13 (FIGS. 4–5) is shown to be configured in the aforementioned modified rectangular shape as a non-circular ring having the major lateral dimension "x" being substantially greater than the perpendicular dimension "y". Walls 17a–17d are resilient so that inward pressure applied to end portions 18a and 18b urges them inwardly and correspondingly urges outwardly portions adjacent said perpendicular dimension, e.g., regions 19a and 19b, thereby decreasing said major dimension "x" and increasing perpendicular dimension "y". The values of "x" and "y" are such that when dimension "y" is expanded, the geometry of the interior region 20 is changed so that turnable member 13 can be slipped over one of the lips 14a/14b of FIG. 3; and then when pressure is released, forms the composite assembly depicted in FIG. 7.

Within turnable member 13, and mounted on spaced-apart opposed inner surfaces thereof are arcuate surfaces 22a and 22b which are optionally adapted for frictional engagement with corresponding outer surface 12a of collar 12. Thus, when pressure on end portions 18a and 18b is released, surfaces 22a and 22b frictionally engage surface 12a and/or the bottleneck, thereby to impart restraint to turning of turnable member 13 unless and until inward pressure is again imparted to surfaces 18a and 18b. In some instances, such frictional engagement may be adequate to hold turnable member in a desired position during subsequent usage. However, to supplement such, or in instances when frictional engagement is not employed, there are provided optional protuberances 24a–24b which are positioned to cooperate with correspondingly spaced indentations 25 to affirmatively lock turnable member 13 in a desired location until it is desired to rotate it to another position. As with the foregoing frictional engagement description, when protuberances are provided and are positioned within their mating indentations, pressure applied to end portions 18a–18b urges portions 19a–19b outwardly to disengage protuberances 24a–24b from indentations 25 thus permitting turnable member 13 to be rotated to a new position.

Figure 4:
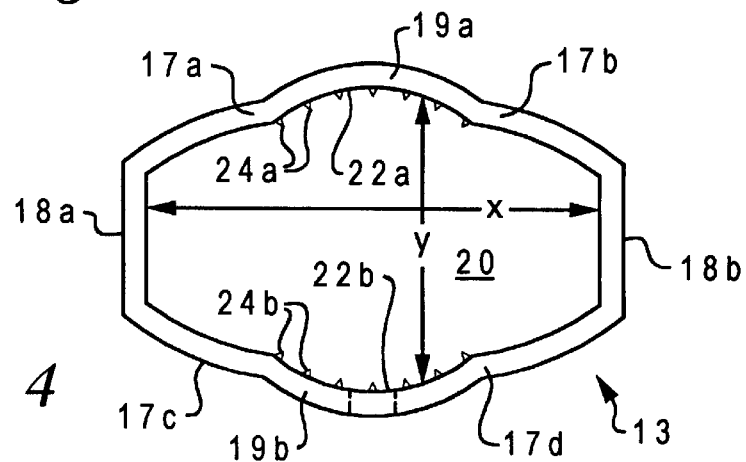
FIG. 4 is a top view of a turnable selecting member adapted for fitting around the annular-shaped identity-displaying part of the ring assembly of FIG. 3.

Further reference to FIGS. 4 and 5 reveals the presence of window 27 which is provided to permit viewing of that one of the aforementioned indicia which is exposed to view therethrough when turnable member is turned to a selected position. Thus, provision is made for the user to select any desired one of the available indicia so as to impart a unique identification to the beverage container on whose neck the indicia are displayed or to which the collar 12 is attached (FIG. 7).

Now turning to FIG. 6, it will be seen to depict a resiliently stretchable composite collar member for use on bottles that are not equipped with adequate collars. There, it will be seen, are a principal section 30 which may be elongated (as shown) or shortened as depicted by member 31. For either member 30 or 31, identity-indicating alpha numeric indicia similar to those described above, may be displayed on the exposed circumferential surface as illustrated in FIG. 2. To install the member on a conventional bottle neck, it is stretched and pulled over the neck of the bottle, then released so that stretching is relieved and the collar then remains positioned on the bottle neck.

As mentioned above, FIG. 7 is a partially exploded view of the members of FIGS. 3–5 when assembled together. The assembly 32 is shown with the turnable member 13 in a position to display the alphabetical letter A through its window 27. The upper part 33a of the bottle neck 33 extends above lip 14a of assembly 32, and the lower part 33b of the bottle neck 33 extends downwardly below lip 14b of assembly 32. The feature of turnability is represented by arrows 13a and 13b which suggest that in the preferred embodiment, the turnable member can be turned either clockwise or counterclockwise so as to progressively display successive ones of the identifying indicia (e.g., numerals as shown in FIG. 1, or alphabetical letters as shown in FIG. 2). It should be noted, however, that the turnable member may be made to be unidirectional and/or completely rotatable if desired.

Figure 8:
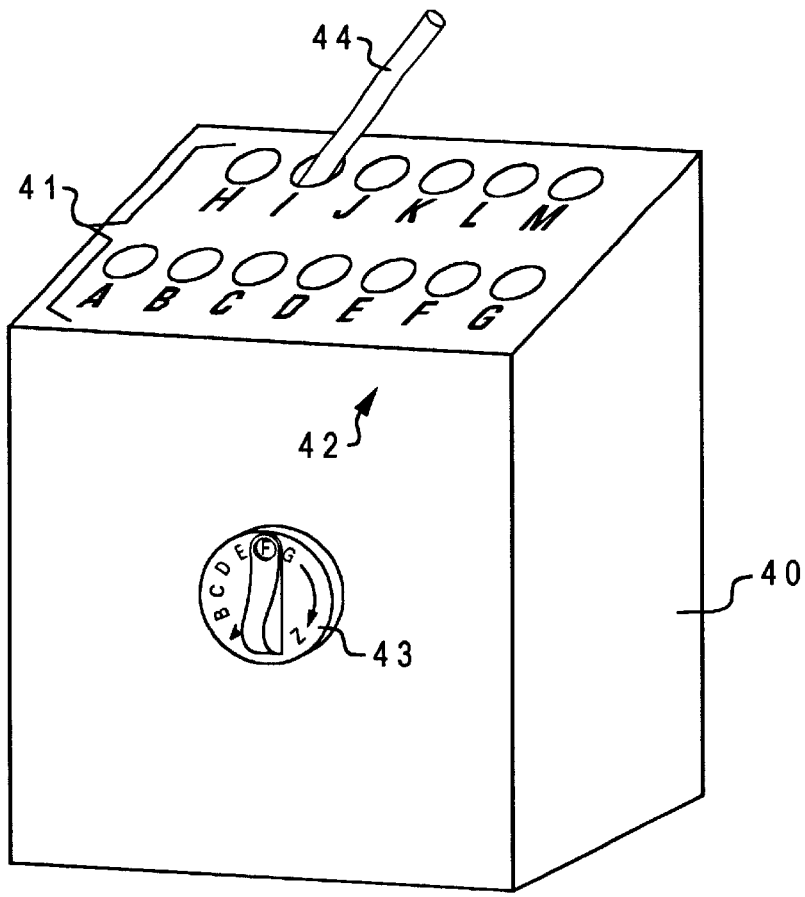
FIG. 8 is a perspective view of a boxed beverage container fitted with a plurality of indicia-representing and identifying apertures according to the invention.

Turning to FIG. 8, it will be seen that it is a perspective view of a boxed beverage container 40 fitted with a plurality of indicia-representing and identifying apertures 41a–41m according to one preferred embodiment of the invention. Mounted on a face of container 40 such as the front face 42, there is an optional dial 43, containing an array of indicia corresponding to those depicted in FIGS. 1 and 2 (e.g., alphabetical letters and/or arabic numerals). Preferably, dial 43 is detachable and re-usable. However it may be affixed permanently to container 40 if desired.

For the container 40, identification and association with a particular person is made by selecting a particular one of the apertures to puncture as is illustrated by puncture of aperture 41I by drinking straw 44. The remaining apertures are, of course, left in their original closed conditions. If further concern for individuality exists, optional dial 43 may be turned to a selected position, thereby providing further protection against confusion with choices by another person.

Figure 9:
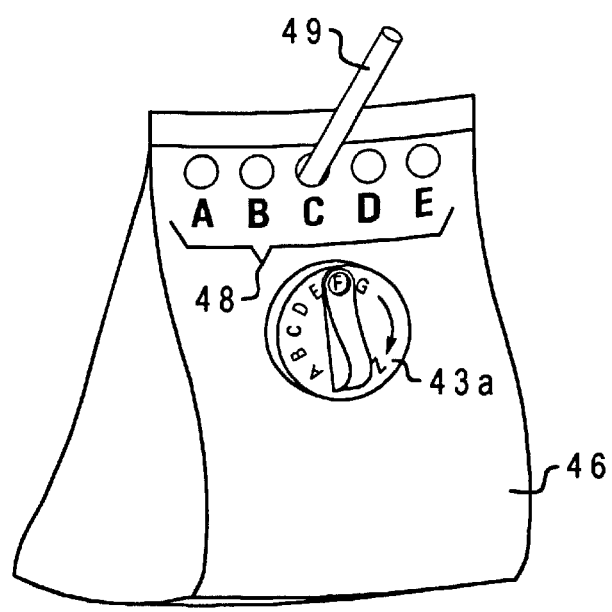
FIG. 9 is a perspective view of a bagged beverage container fitted with a plurality of indicia-representing and identifying apertures according to the invention.

FIG. 9 is a perspective view of a bagged beverage container fitted with a plurality of indicia-representing and identifying apertures 48 according to the invention. There, it will be seen, the principles of the invention as illustrated in FIG. 8 are correspondingly extended to a conventionally bagged beverage. An optional dial 43a is positioned on a face 46 of the bag, and a plurality of apertures 48 similar to those of FIG. 8 are provided for individual selection by the user. In FIG. 9, aperture "C" has been selected for penetration by drinking straw 49.

As mentioned above, FIG. 10 is a top view of a beverage cup lid 50 which is fitted with a plurality of indicia-representing and identifying penetrable apertures A, B, C, . . . N, according to the invention. One of these may be selected for penetration (and consequently, user identification) as with the descriptions of FIGS. 8 and 9. However, an additional aperture 52 may be provided, if desired, for insertion of straw 53. In such event, one of the indicia A . . . N may be marked for example, with a pen, pencil or similar writing instrument to correlate it with the identity of the user.

As previously set forth, FIG. 11 is a top view of a conventional pop-top beverage can 55 fitted with identification indicia 56 (therein illustrated as alphabetical letters A–Z) and a selectable wand-like pointing device 57 according to an embodiment of the invention.

The opening member 58 on a conventional pop-top beverage can is typically attached to the top 59 by a brad, or rivet 60 around which member 58 can rotate once the can is opened. Accordingly, a pointing device such as wand-like arrow 57 may be mounted on the brad, or rivet, 60 and swiveled to point to a selected one of the indicia. Such partial rotation (swiveling) is indicated by arcuate arrows 63 and phantom representation 57a of wand-like pointer 57. The indicating pointer (e.g., pointer 57) may be retained in a selected position by the friction imparted by brad, or rivet 60; or if additional retentive capability is desired, by protuberances and indentations as described above in connection with FIGS. 3–5.

FIG. 12 is a front elevation detailed view of a segment 70 of an identification ring (similar to the identification ring 12 depicted in FIG. 2), to which privacy flaps 72 of FIGS. 13 and 14 have been added. As the name suggests, the privacy flaps 72 when in the closed or obscuring positions (FIG. 13), selectively cover the underlying identifying indicia and prevent view thereof. When in the open or viewing positions (FIG. 14), they selectively display the underlying indicia to view. In FIG. 12, an indicating indicia alphabetical letter "A" is revealed to view since its associated privacy flap 72a is in its open position; whereas the adjacent indicia (Z and B which are shown in dashed lines) are obscured from view by their respective flaps 73 and 74 that are in their closed positions.

As mentioned above, FIG. 13 is a detail, partly in section, depicting one of the privacy flaps of FIG. 12 in its closed position in which it prevents view of its covered indicia. There, it will be observed, are two generally L-shaped sections 76 and 77 which are hinged together by hinge 78. Also retaining them in closed engagement is frictional/latched fitting 79 comprised of springy members 79a and 79b. On the upper surface of inverted L-shaped member 77 there is provided a groove or notch 80 which is adapted for engagement by a user's finger nail so as to facilitate disengagement from the closed position and deployment (by pivoting member 77 around hinge 78) into the open position as shown in FIG. 14.

As previously mentioned, FIG. 14 is a detail similar to that of FIG. 13 but depicting the privacy flap 72 in its open, or indicia revealing, position. This position, as previously mentioned (and as depicted in FIG. 12), reveals the underlying identifying indicia to view, thus identifying the container on which it is mounted with a particular person.

It will now be evident that there has been described herein a system and method for improving sanitation for containers adapted to contain products for human consumption such as beverages. Although the inventions hereof have been described by way of preferred embodiments, it will be evident that adaptations and modifications may be employed without departing from the spirit and scope thereof.

The terms and expressions employed herein have been used as terms of description and not of limitation; and thus, there is no intent of excluding equivalents, but on the contrary it is intended to cover any and all equivalents that may be employed without departing from the spirit and scope of the inventions.

What is claimed is:

1. A system for improving personal hygiene through personally identifying a container having an annular neck and containing a product adapted for human consumption comprising:
   (a) an annular region on an exterior annular surface of said neck of said container, said annular region having identity-indicating alpha-numeric indicia circumferentially disposed within said annular region;
   (b) a turnable member including position-retaining means mounted on said annular region; said turnable member having selection display means including a window in a surface thereof for selectively and progressively displaying said alpha-numeric indicia as said member is turned; said turnable member including a pair of resilient regions responsive to pressure applied thereto for releasing said position-retaining means thereby to permit turning of said turnable member to a selected position; wherein said turnable member including a multi-faceted non-circular ring having a major lateral dimension greater than a perpendicular lateral dimension, and having one or more regions adjacent extremities bounding said major dimension which, when urged inwardly, correspondingly urge outwardly portions adjacent said perpendicular dimension thereby decreasing said major dimension and increasing said perpendicular dimension;
   (c) means including said resilient regions for controllably turning said turnable member to a selected position to display a selected one of said alpha-numeric indicia; and
   (d) position-retaining means for retaining said turnable member in said selected position.

2. A system according to claim 1 wherein said position-retaining means includes frictionally engaging surfaces of said neck and said turnable member.

3. A system according to claim 1 wherein said position-retaining means includes a plurality of spaced-apart indentations in said annular region and spaced-apart protrusions on an inner surface of said turnable member, said spaced-apart protrusions being adapted for engagement with ones of said spaced-apart indentations.

4. A system for improving personal hygiene through personally identifying a container having an annular neck and containing a product adapted for human consumption comprising:
   (a) an annular ring about said neck of said container, said annular ring having a pair of spaced parallel lips and identity-indicating alpha-numeric indicia circumferentially disposed around said ring between said lips;
   (b) a turnable member mounted on said annular ring between said lips; said turnable member having selectable display means including a window in a surface thereof for selectively and progressively displaying said alpha-numeric indicia as said member is turned; wherein said turnable member including a multi-faceted non-circular ring having a major lateral dimension greater than a perpendicular lateral dimension, and having one or more regions adjacent extremities bounding said major dimension which, when urged inwardly, correspondingly urge outwardly portions adjacent said perpendicular dimension thereby decreasing said major dimension and increasing said perpendicular dimension;
   (c) means for controllably turning said turnable member to a selected position to display a selected one of said alpha-numeric indicia; and
   (d) position-retaining means for retaining said turnable member in said selected position.

5. A system according to claim 4 wherein said container is a beverage container.

6. A system according to claim 4 wherein said position-retaining means includes an exterior surface of said annular ring and a corresponding interior surface of said turnable member.

7. A system according to claim 4 wherein said position-retaining means includes a plurality of spaced-apart indentations in said annular ring and spaced-apart protrusions on an inner surface of said turnable member, said spaced-apart protrusions being adapted for engagement with ones of said spaced-apart indentations.

8. A system according to claim 7 wherein said position-retaining means further includes frictionally engaging surfaces of said annular ring and said turnable member.

9. A system according to claim 4 wherein said annular ring is part of a screw-top bottle cap remaining after said screw-top is unscrewed to open said container.

10. A system according to claim 4 wherein said annular ring is resilient and is forced onto said neck of said container.

11. A system according to claim 4 wherein said turnable member includes a pair of resilient regions, and means including said resilient regions responsive to pressure applied thereto for releasing said position-retaining means thereby to permit turning of said turnable member to a selected position.

12. A system according to claim 4 wherein said lips are positioned at opposite extremities of said ring.

* * * * *